US009157833B2

(12) United States Patent
Narumi

(10) Patent No.: US 9,157,833 B2
(45) Date of Patent: Oct. 13, 2015

(54) RUNNING-RESISTANCE CONTROL DEVICE

(75) Inventor: Yasumasa Narumi, Koshigaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 610 days.

(21) Appl. No.: 13/521,558

(22) PCT Filed: Feb. 7, 2011

(86) PCT No.: PCT/JP2011/052487
§ 371 (c)(1),
(2), (4) Date: Jul. 11, 2012

(87) PCT Pub. No.: WO2011/099436
PCT Pub. Date: Aug. 18, 2011

(65) Prior Publication Data
US 2013/0060500 A1 Mar. 7, 2013

(30) Foreign Application Priority Data
Feb. 10, 2010 (JP) .................................. 2010-027063

(51) Int. Cl.
*G01C 19/00* (2013.01)
*G01M 17/007* (2006.01)
(52) U.S. Cl.
CPC ................................. *G01M 17/0074* (2013.01)
(58) Field of Classification Search
CPC .................................................. G01M 17/0074
USPC ......................................................... 702/104
See application file for complete search history.

(56) References Cited

FOREIGN PATENT DOCUMENTS

| JP | 57160042 A | * | 10/1982 |
| JP | 04-068578 B2 | | 11/1992 |
| JP | 05-026987 Y2 | | 7/1993 |
| JP | 2008-076225 A | | 4/2008 |
| JP | 2008076225 A | * | 4/2008 |
| JP | 2010-002294 A | | 1/2010 |

* cited by examiner

*Primary Examiner* — Tung S Lau
*Assistant Examiner* — Xiuquin Sun
(74) *Attorney, Agent, or Firm* — Foley & Lardner LLP

(57) ABSTRACT

A running resistance device for a chassis dynamometer performs an environmental test while applying a running resistance and an environmental condition similar to a road running to the chassis dynamometer. Air-conditioning equipment, a thermometer and a barometer are provided in an environmental test laboratory. An air-conditioning control panel and a chassis-dynamometer control section are provided outside the environmental test laboratory. An environmental-correction calculating section of the chassis-dynamometer calculates an environmental correction value of a rolling resistance and an environmental correction value of an air resistance coefficient from air-temperature and air-pressure values detected by the thermometer and barometer, respectively; calculates a target running resistance from the calculated environmental correction values; and outputs the target running resistance to a running-resistance-command generating section of the chassis-dynamometer, which controls the chassis dynamometer by generating the running-resistance command based on the target running resistance and a detection signal of speed of the chassis dynamometer.

5 Claims, 2 Drawing Sheets

CONFIGURATION DIAGRAM OF ENVIRONMENTAL TEST FACILITY

CONFIGURATION DIAGRAM OF ENVIRONMENTAL TEST FACILITY

CONFIGURATION DIAGRAM ACCORDING TO PRESENT INVENTION

RUNNING-RESISTANCE CONTROL DEVICE

TECHNICAL FIELD

The present invention relates to a running-resistance control device for a chassis dynamometer, particularly to a running-resistance control device adapted to respond to an environmental change in a test laboratory.

BACKGROUND ART

Instead of conducting an evaluation test by driving a (assembly-)finished vehicle on a road, recently, a drive wheel(s) of the finished vehicle is placed on a roller of chassis dynamometer for evaluation. In such a case, a running-resistance load which is generated by the road running of the vehicle is simulated by setting an absorption load torque of the chassis dynamometer. At this case, a running resistance has been obtained by causing the vehicle to coast on an actual road such as a test course in advance. When such a running-resistance data is obtained, the environment such as wind velocity, air temperature, air pressure and humidity takes a wide range of variations. Hence, the obtained data is treated as a data under a standard atmospheric condition (air temperature: 20° C., air pressure: 101.3 kPa, calm wind), in order to determine a target running resistance.

However, the running resistance obtained on the actual road is influenced by its environment, particularly by air pressure. For example, since air density is low at a high altitude of 3000 m above sea level, a percent for which an air resistance accounts in the running resistance is low so that a vehicle running is influenced and different at a highland. Therefore, as an environmental test device designed for a vehicle which runs at a high altitude, Patent Literature 1 is know. This Patent Literature 1 discloses that air pressure of a low-pressure environmental test laboratory is controlled by using a suction blower or a pressure-reducing blower.

Patent Literature 1: Japanese Patent No. 4-068578

SUMMARY OF THE INVENTION

Technical Problem

Except the special environmental test laboratory as disclosed in the Patent Literature 1, generally in many cases, an environmental test laboratory in which the chassis dynamometer is provided is kept under a constant environmental condition. Hence, the test is performed without considering the influence of environmental change on the running resistance. Moreover, even in a case that a room environment of the environmental test laboratory is changed; conventionally, the running resistance is set in the same manner as under the standard atmospheric condition and does not respond to the environmental change. Therefore, a vehicle which runs at the high altitude is tested by using a running-resistance value different from what is realized on the actual road. Accordingly, a test result different from that of the actual road running is obtained in the environmental test laboratory.

It is an object of the present invention to provide a running-resistance control device in an environmental test capable of responding to a change in air temperature and air pressure in real time.

According to the present invention, there is provided a running resistance device for a chassis dynamometer, the chassis dynamometer being provided in an environmental test laboratory and having a roller on which a vehicle under test is placed, wherein the running resistance device is configured to perform an environmental test while applying a running resistance and an environmental condition similar to a road running to the chassis dynamometer, the running resistance device comprising: a running-resistance-command generating section configured to generate a running-resistance command; and an environmental-correction calculating section provided on an input side of the running-resistance-command generating section and configured to receive an air temperature and an air pressure which are detected inside the environmental test laboratory, and to calculate an environmental correction value of a rolling resistance and an environmental correction value of an air resistance coefficient, and calculate a target running resistance from the environmental correction values, wherein the running-resistance-command generating section is configured to control the chassis dynamometer by generating the running-resistance command from a relation between the target running resistance and a detection signal of speed of the chassis dynamometer.

According to the present invention, the environmental correction value of the rolling resistance and the environmental correction value of the air resistance coefficient are calculated by being varied with reference to a predetermined standard atmospheric condition, and the target running resistance is calculated by use of the environmental correction values.

Furthermore, according to the present invention, the environmental-correction calculating section is configured to calculate the environmental correction value a1 of the rolling resistance and the environmental correction value c1 of the air resistance coefficient by the following formulas:

$$a1=(a-cv^2)\times(1+0.00864\times(Te-(t+273)))$$

$$c1=(p+(t+273))\times c\times Te+P$$

wherein a [N] denotes a value corresponding to the rolling resistance, c [N/(km/h)$^2$] denotes a value corresponding to an air resistance coefficient, P [kPa] denotes an average atmospheric pressure in a test course when measuring a coasting time, p [kPa] denotes an air pressure value in the test laboratory, v [km/h] denotes an average value of a component of wind velocity which is parallel to the test course when measuring the coasting time, Te [K] denotes an average air temperature in the test course when measuring the coasting time, and t [° C.] denotes a temperature value.

DESCRIPTION OF EMBODIMENTS

Figure 1:
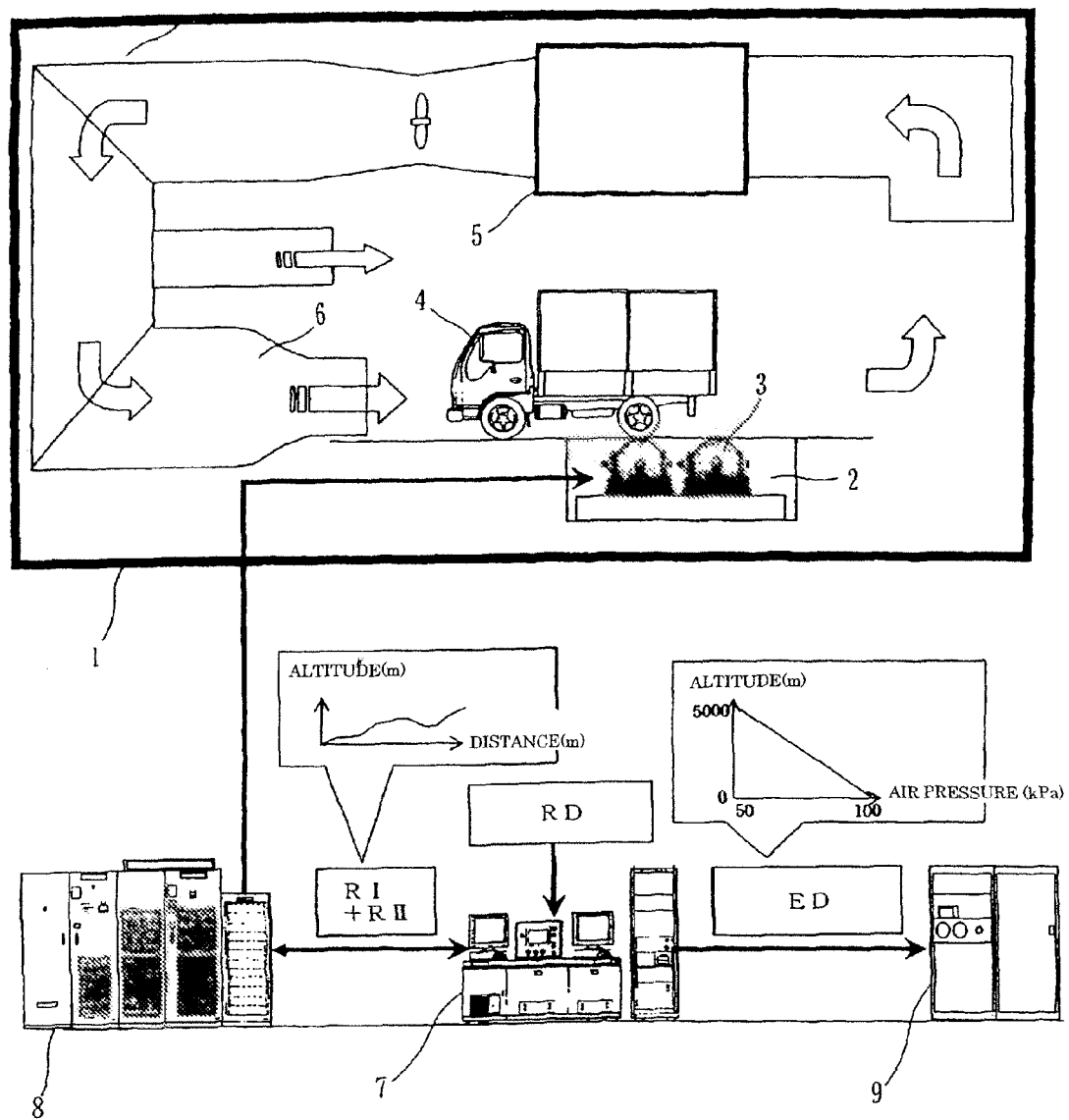
FIG. 1 A schematic configuration view of environmental test system showing an embodiment according to the present invention.

FIG. 1 is a schematic configuration view of chassis dynamometer system showing an embodiment according to the present invention. A reference sign 1 denotes an environmental test laboratory. A reference sign 2 denotes a dynamometer. A reference sign 3 denotes a roller(s) on which a drive wheel(s) of a vehicle 4 under test is placed or held. A reference sign 5 denotes an air-conditioning equipment. The air-conditioning equipment 5 controls air temperature and air pressure in the environmental laboratory, and blows wind (corresponding to air resistance) to a front of the under-test vehicle 4 through a wind tunnel 6. A reference sign 7 denotes an operation panel for the chassis dynamometer. The operation panel 7 is constituted by a personal computer and the like.

The operation panel 7 sets a real-road data (actual-road data) RD such as vehicle speed, distance and altitude, and sets a running resistance-and-inclination (gradient) command RI and an environmental simulation command ED (as to air temperature, air pressure, humidity). It is preferable that a thermometer for producing the environmental simulation command ED is disposed at a location near a wind vent of the wind tunnel 6 which is set toward the under-test vehicle 4. Moreover, a barometer for producing the environmental simulation command ED is disposed at a location into which the wind does not blow, for example, at a rear side of the under-test vehicle 4.

A reference sign 8 denotes a control panel for the dynamometer 2. The control panel 8 controls the dynamometer 2 on the basis of signals set by the operation panel 7 and detection signals. A reference sign 9 denotes an air-conditioning control panel. The air-conditioning control panel 9 controls the air-conditioning equipment 5 on the basis of the environmental simulation command ED set by the operation panel 7, and thereby, controls an environmental condition within the environmental test laboratory 1.

Figure 2:
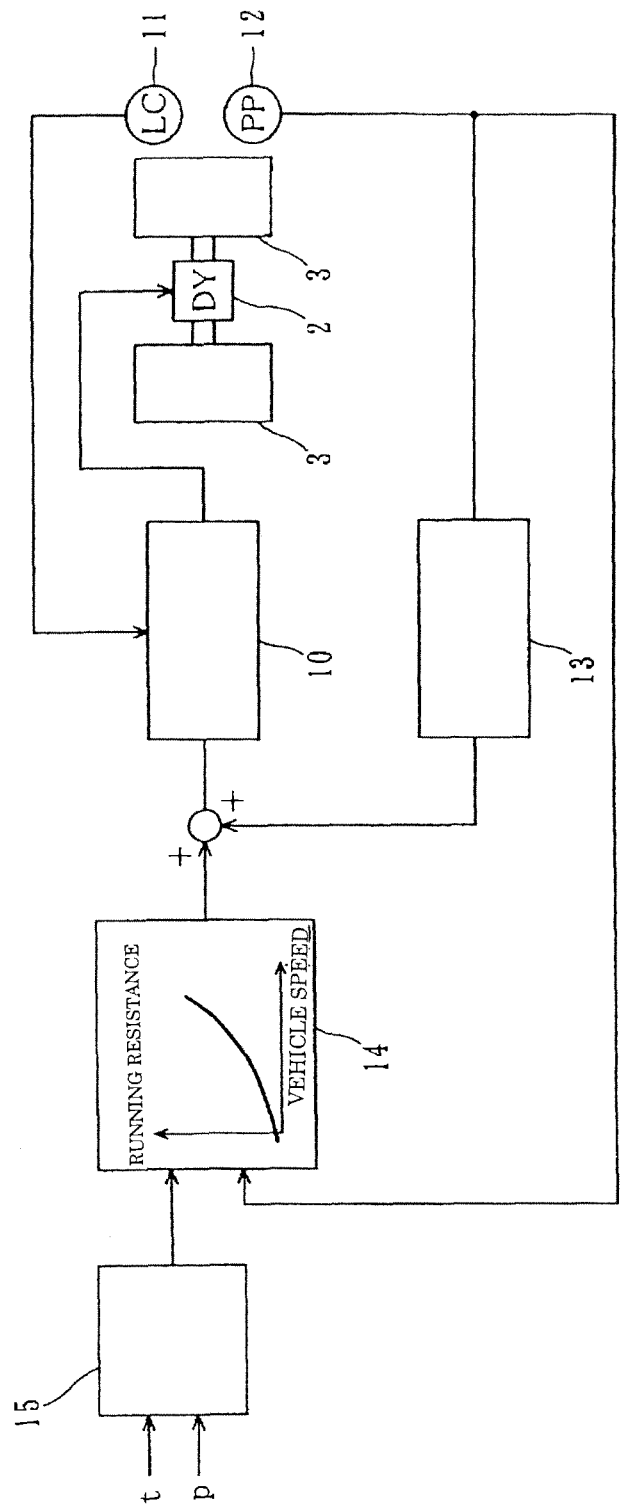
FIG. 2 A configuration view of a running-resistance control device according to the present invention.

FIG. 2 is a configuration view of a chassis-dynamometer control section for controlling the running resistance. A reference sign 10 denotes an inverter control unit. The inverter control unit 10 includes an inverter and a control section for controlling the inverter. This inverter control section calculates a torque value to be absorbed by the dynamometer 2 (i.e., torque which should be absorbed by the dynamometer 2), from an inputted torque command and a torque value detected by a load cell 11. Then, the inverter control section uses the calculated torque value as an electric-current control signal for the inverter, and thereby, controls the dynamometer 2 through the inverter by way of current control. A reference sign 12 denotes a speed detecting section. A speed signal detected by the speed detecting section 12 is inputted into an electric inertia control section 13 and a running-resistance-command generating section 14. The electric inertia control section 13 calculates an inertia part of the under-test vehicle from a vehicle-body-weight data, and then, uses this calculated result as an electric inertia which is generated by the dynamometer 2. The running-resistance-command generating section 14 has a table showing the running resistance on an ordinate axis and the vehicle speed V on an abscissa axis. The running-resistance-command generating section 14 generates a running-resistance command according to the vehicle speed. A sum of this running-resistance command and the inertia part derived from the electric inertia control section 13 is inputted into the inverter control unit 10 as the torque command.

According to the present invention, an environmental-correction calculating section 15 is provided in the above-mentioned control loop for the running resistance. The environmental-correction calculating section 15 calculates a target value F by receiving the air temperature t in the environmental test laboratory 1 and the air pressure p in the environmental test laboratory 1.

Target Running Resistance Value $F = a1 + c1 V^2$

Wherein, a reference sign a1 denotes an environmental correction value of a rolling resistance which depends on environmental change (i.e., which is varied from a rolling-resistance value under the standard atmospheric condition). A reference sign c1 denotes an environmental correction value of air resistance coefficient which depends on environmental change (i.e., which is varied from an air-resistance-coefficient value under the standard atmospheric condition). These correction values are calculated based on the following formulas ① and ②.

$$a1 = (a - cv^2) \times (1 + 0.00864 \times (Te - (t + 273))) \qquad ①$$

$$c1 = (p \div (t + 273)) \times c \times Te \div P \qquad ②$$

Wherein, a [N]: value corresponding to rolling resistance c [N (km/h)$^2$]: value corresponding to air resistance coefficient P [kPa]: average atmospheric pressure in a test course when measuring a coasting time p [kPa]: air pressure in environmental test laboratory v [km/h]: average value of a component of wind velocity which is parallel to the test course when measuring the coasting time Te [K]: average air temperature in the test course when measuring the coasting time t [° C.]: temperature in environmental test laboratory That is, when performing the environmental testing, the air-conditioning equipment 5 which is controlled through the air-conditioning control panel 9 varies momentarily based on the environmental simulation command. The air temperature and air pressure inside the environmental test laboratory 1 which are caused by the variation of the air-conditioning equipment 5 are detected and then inputted into the environmental-correction calculating section 15. Then, the environmental-correction calculating section 15 calculates the environmental correction value a1 for the rolling resistance and the environmental correction value c1 for the air resistance, and thereby calculates "a1+c1 V$^2$". This calculated result is inputted into the running-resistance-command generating section 14. The running-resistance-command generating section 14 generates a running-resistance value in accordance with the target running resistance F (a1+c1 V$^2$) obtained by the environmental correction and a speed signal V of the chassis dynamometer detected by the speed detector 12. Then, the value calculated by the running-resistance-command generating section 14 is added to the inertia part derived from the electric inertia control section 13. That is, the sum value of these calculation results of the running-resistance-command generating section 14 and the electric inertia control section 13 is inputted into the inverter control unit 10 as the torque command. Therefore, this torque command is in real time in response to (accords with) the environment of the environmental test laboratory 1. As a result, it becomes possible to perform a test adhering to the actual-road running.

The environmental correction value a1 for the rolling resistance is related to a rolling-resistance value under the standard atmospheric condition, and the environmental correction value c1 for the air resistance coefficient is related to an air-resistance-coefficient value under the standard atmospheric condition. Hence, these environmental correction values a1 and c1 can be calculated by being varied based on respective values set under the standard atmospheric condition. In Japan, the standard atmospheric condition is defined by an air temperature value equal to 20° C., an air pressure value equal to 101.3 kPa and a calm wind, as mentioned above. Therefore, in a case that the standard atmospheric condition has a difference between national governments or local governments or the like, each of the environmental correction values a1 and c1 has its difference between the national or local governments so that the correcting formula for calculating the target running-resistance value F has its difference. According to a Standard-Atmosphere Correcting Formula of Standard Test Equipment/Method in New Safety Standards for Road Transport Vehicles issued by Ministry of Land, Infrastructure, Transport and Tourism of Japan, the target running resistance $F_0$ is specified as follows.

Target Running Resistance $F_0 = a_0 + c_0 V^2$ $$a_0 = (a - c\,v^2) \times (1 + 0.00864 \times (Te - 293))$$

$$c_0 = 0.346 \times c \times Te \div P$$

That is, the correction is fixed.

According to the present invention, an environmental change can be reflected in the running resistance, so that an accurate evaluation of vehicle performance becomes possible. Moreover, such an evaluation can be performed on the chassis dynamometer in a normal environmental test laboratory, i.e., without adding a special device to the environmental test laboratory. Therefore, a cost reduction in test and a repeatability in test can be attained.

The invention claimed is:

1. A running resistance device for a chassis dynamometer, the chassis dynamometer being provided in an environmental test laboratory and having a roller on which a vehicle under test is placed, wherein the running resistance device is configured to perform an environmental test while applying a running resistance and an environmental condition similar to a road running to the chassis dynamometer, the running resistance device comprising:
   an air-conditioning equipment provided in the environmental test laboratory;
   a thermometer provided in the environmental test laboratory;
   a barometer provided in the environmental test laboratory;
   an air-conditioning control panel provided outside the environmental test laboratory and configured to control the air-conditioning equipment to execute an environmental simulation within the environmental test laboratory; and
   a chassis-dynamometer control section provided outside the environmental test laboratory and configured to control the chassis dynamometer, the chassis-dynamometer control section including
      a running-resistance-command generating section configured to generate a running-resistance command; and
      an environmental-correction calculating section provided on an input side of the running-resistance-command generating section and configured
         to receive an air temperature and an air pressure which are respectively detected by the thermometer and the barometer inside the environmental test laboratory,
         to calculate an environmental correction value of a rolling resistance and an environmental correction value of an air resistance coefficient, and
         to calculate a target running resistance from the environmental correction values,
   wherein the running-resistance-command generating section is configured to control the chassis dynamometer by generating the running-resistance command from a relation between the target running resistance and a detection signal of speed of the chassis dynamometer.

2. The running resistance device according to claim 1, wherein
   the environmental correction value of the rolling resistance and the environmental correction value of the air resistance coefficient are calculated by being varied with reference to a predetermined standard atmospheric condition, and
   the target running resistance is calculated by use of the environmental correction values.

3. A running resistance device for a chassis dynamometer, the chassis dynamometer being provided in an environmental test laboratory and having a roller on which a vehicle under test is placed, wherein the running resistance device is configured to perform an environmental test while applying a running resistance and an environmental condition similar to a road running to the chassis dynamometer, the running resistance device comprising:
   a running-resistance-command generating section configured to generate a running-resistance command; and
   an environmental-correction calculating section provided on an input side of the running-resistance-command generating section and configured
      to receive an air temperature and an air pressure which are detected inside the environmental test laboratory,
      to calculate an environmental correction value of a rolling resistance and an environmental correction value of an air resistance coefficient, and
      to calculate a target running resistance from the environmental correction values;
   wherein the running-resistance-command generating section is configured to control the chassis dynamometer by generating the running-resistance command from a relation between the target running resistance and a detection signal of speed of the chassis dynamometer,
   wherein the environmental-correction calculating section is configured to calculate the environmental correction value a1 of the rolling resistance and the environmental correction value c1 of the air resistance coefficient by the following formulas:

$$a1 = (a - cv^2) \times (1 + 0.00864 \times (Te - (t + 273)))$$

$$c1 = (p \div (t + 273)) \times c \times Te \div P$$

wherein a [N] denotes a value corresponding to the rolling resistance, c $[N/(km/h)^2]$ denotes a value corresponding to the air resistance coefficient, P [kPa] denotes an average atmospheric pressure in a test course when measuring a coasting time, v [km/h] denotes an average value of a component of wind velocity which is parallel to the test course when measuring the coasting time, p [kPa] denotes an air pressure value in the environmental test laboratory, t [° C.] denotes a temperature value in the environmental test laboratory, and Te [K] denotes an average air temperature in the test course when measuring the coasting time.

4. The running resistance device according to claim 1, wherein the running-resistance device is capable of responding to a change in air temperature, air pressure or a combination thereof in real time.

5. The running resistance device according to claim 1, wherein the environmental-correction calculating section is configured to calculate the environmental correction value a1 of the rolling resistance and the environmental correction value c1 of the air resistance coefficient by the following formulas:

$$a1 = (a - c\,v^2) \times (1 + 0.00864 \times (Te - (t + 273)))$$

$$c1 = (p \div (t + 273)) \times c \times Te \div P$$

wherein a [N] denotes a value corresponding to the rolling resistance, c $[N/(km/h)^2]$ denotes a value corresponding to the air resistance coefficient, P [kPa] denotes an average atmospheric pressure in a test course when measuring a coasting time, v [km/h] denotes an average value of a component of wind velocity which is parallel to the test course when measuring the coasting time, p [kPa] denotes an air pressure value in the environmental test laboratory, t [° C.] denotes a temperature value in the environmental test laboratory, and Te [K] denotes an average air temperature in the test course when measuring the coasting time.

* * * * *